United States Patent [19]

Corsi

[11] Patent Number: 4,652,190
[45] Date of Patent: Mar. 24, 1987

[54] ROTATING MACHINING HEAD FOR AUTOMATIC TOOL MACHINES

[75] Inventor: Armando Corsi, Piacenza, Italy

[73] Assignee: JOBS S.p.A., Italy

[21] Appl. No.: 761,090

[22] Filed: Jul. 31, 1985

[30] Foreign Application Priority Data

Aug. 7, 1984 [IT] Italy .............................. 33525/84[U]

[51] Int. Cl.$^4$ ............................................. B23C 1/12
[52] U.S. Cl. ............................ 409/137; 29/DIG. 84; 51/273; 408/67; 409/201; 409/211
[58] Field of Search ............. 409/137, 201, 202, 209, 409/211, 212, 216; 408/67, 68; 51/273; 29/DIG. 78, 84; 144/252 R, 371

[56] References Cited

U.S. PATENT DOCUMENTS

| | | | |
|---|---|---|---|
| 2,343,875 | 3/1944 | Schwartz | 409/137 X |
| 3,460,435 | 8/1969 | Hucks et al. | 409/235 X |
| 3,483,796 | 12/1969 | Galbarini et al. | 409/216 |
| 3,828,649 | 8/1974 | Lecailtel et al. | 409/137 |

*Primary Examiner*—Z. R. Bilinsky
*Attorney, Agent, or Firm*—McGlew and Tuttle

[57] ABSTRACT

A rotating machining head for automatic tool machines has suction ducts for dust placed inside the head device. This permits the head to have a substantially rounded shape with a minimum encombrance, which is equal in all directions and for any positioning of the head.

8 Claims, 4 Drawing Figures

ROTATING MACHINING HEAD FOR AUTOMATIC TOOL MACHINES

FIELD AND BACKGROUND OF THE INVENTION

The present invention is drawn to a machining head for automatic tool machines or "robots" whose new characteristic consists of the peculiar conformation and disposition of its different parts, in order to obtain an extremely compact unit so as to permit easy maneuvering and easy programming of the machine.

More particularly, the invention is characterized by the disposition of the suction conducts, which are placed inside the operating head, and the shape of the head itself. These features result in numerous advantages illustrated hereinafter.

Among automatic working machines, "robots" are coming more and more into use. Specifically, "robots" are programmable machines which are able to develop, in a completely automatic way, a sequence of operations, even complex ones, and which are also able to ensalve several other machines according to repetitive cycles, without need of an operator.

To allow the greatest flexibility in the use, the tools are generally set over heads fixed at the end of an articulated arm with a given possibility of movement around several axes, so as to bring the device in proximity of the parts to be worked on and place it, at the same time, in the optimal position.

The operating head device according to the invention is designed for this type of machinery.

The problem to be solved is, in this case, the bulk of the machinery which makes difficult and complicated the maneuvering of the operating head with consequent difficulties of machine programming, difficulties which increase with the number of degrees of movement of the supporting arm.

It is also predictable that, near the tool bearing mandrel, an appropriate suction duct will be provided for drawing duct, which is produced, for example in the case of the aeronautical industry, when work is done on carbon fiber parts. Tis produces very fine dust, which besides being dangerous to the health, can also cause damage to the electronics of the machinery since the carbon dust is a conductive material.

These vacuuming ducts become, as a consequence, another element which makes difficult a good utilization of the machinery, particularly in case of an inner working of the parts.

On the other hand, considering that the operating heads have several moving parts (support, mandrel holder, mandrel etc . . . ) plus various motors, the manufactures, in view of high assembling complications, have always placed these suction ducts on the outside of the head, wasting thus part of the available space.

SUMMARY OF THE INVENTION

To obviate the described inconveniences, the following invention proposes an operating head device in which the disposition of the parts is such as to allow the passage of the suction ducts on the inside, so as to obtain a minimum encumbrance in any direction of the whole. Particularly this allows the operating head to have a rounded shape in which the head shows a minimum hindrance, equal in all directions, and so as to allow the head to rotate freely around the supporting shaft without any sort of obstacles, even in the inner working of workpieces.

The invention will now be described in detail with particular reference to the figures enclosed.

DESCRIPTION OF THE PREFERRED EMBODIMENT

Figure 1:
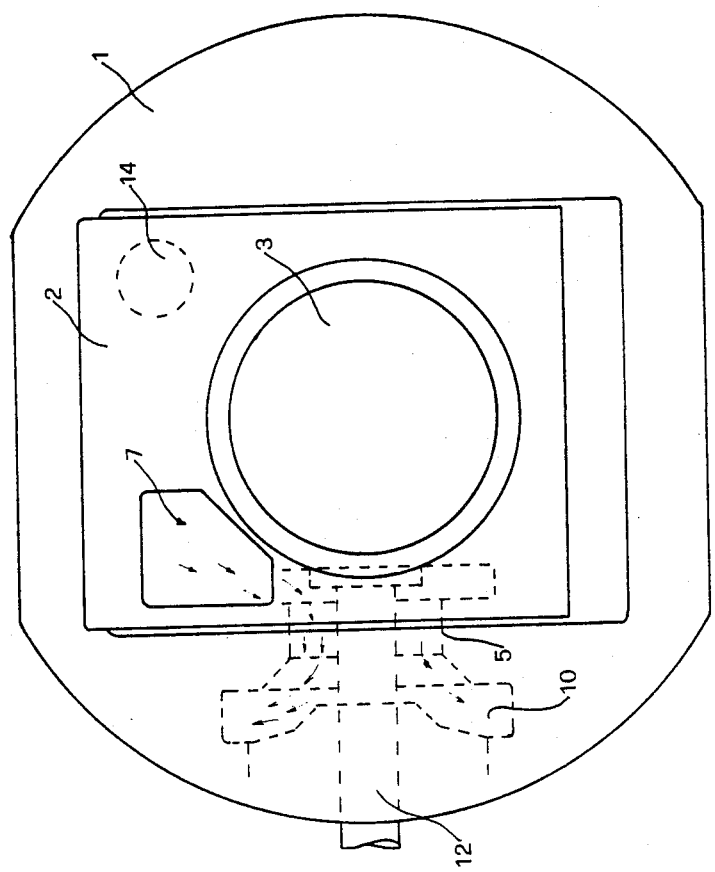
FIG. 1 is a front view of an operating head device according to the invention.
Figure 2:
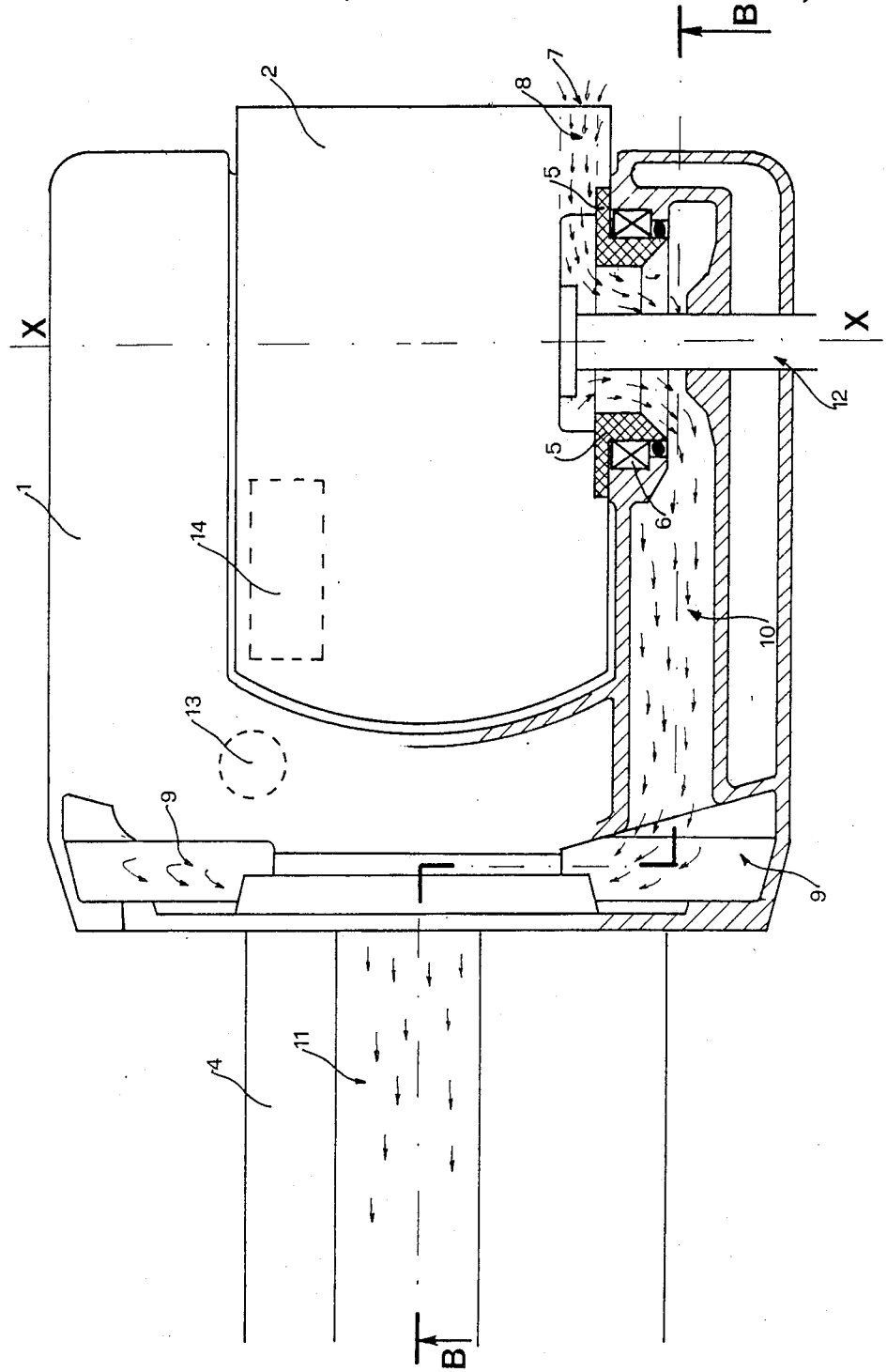
FIG. 2 is a top view, partially in section, of an operating head device according to the invention, with the section taken along line A—A of FIG. 3.
Figure 3:
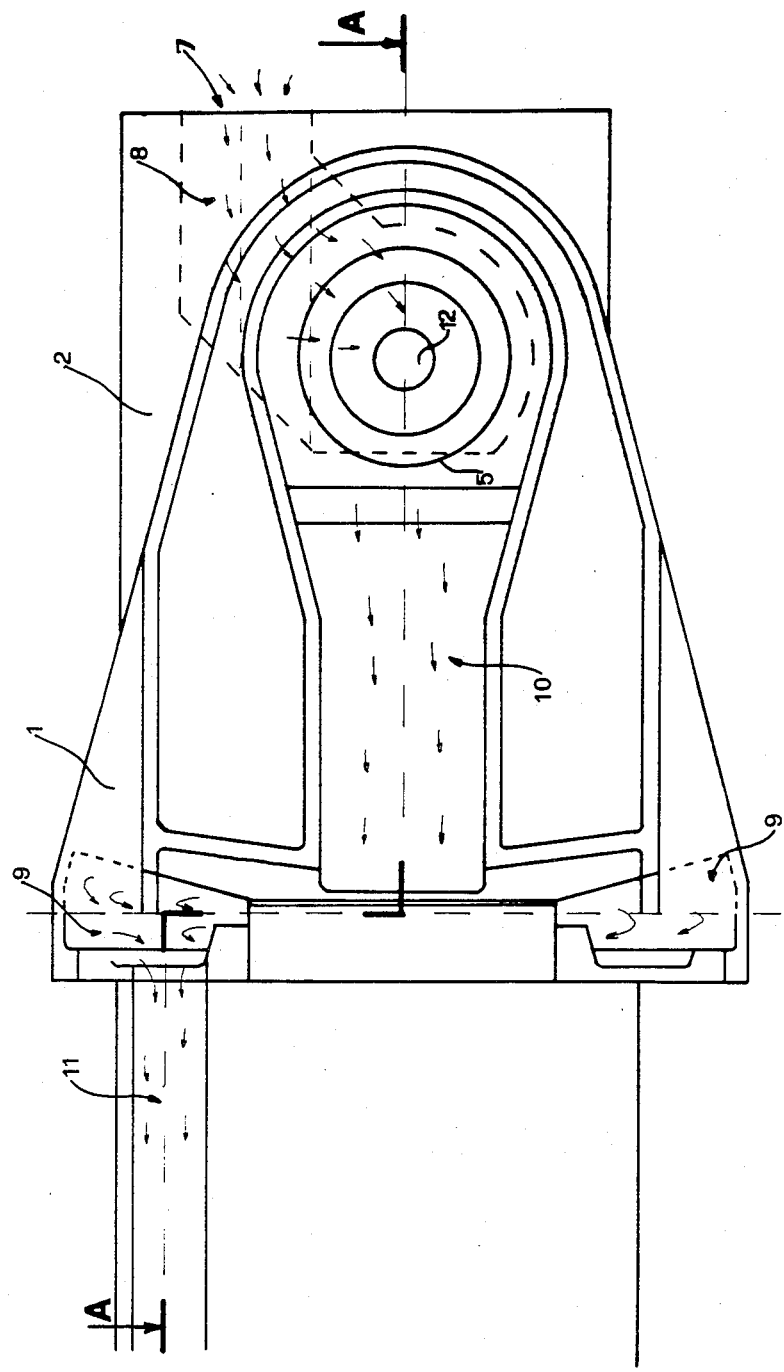
FIG. 3 is a side view, partially in section, of an operating head device according to the invention with the section taken along line B—B of FIG. 2.
Figure 4:
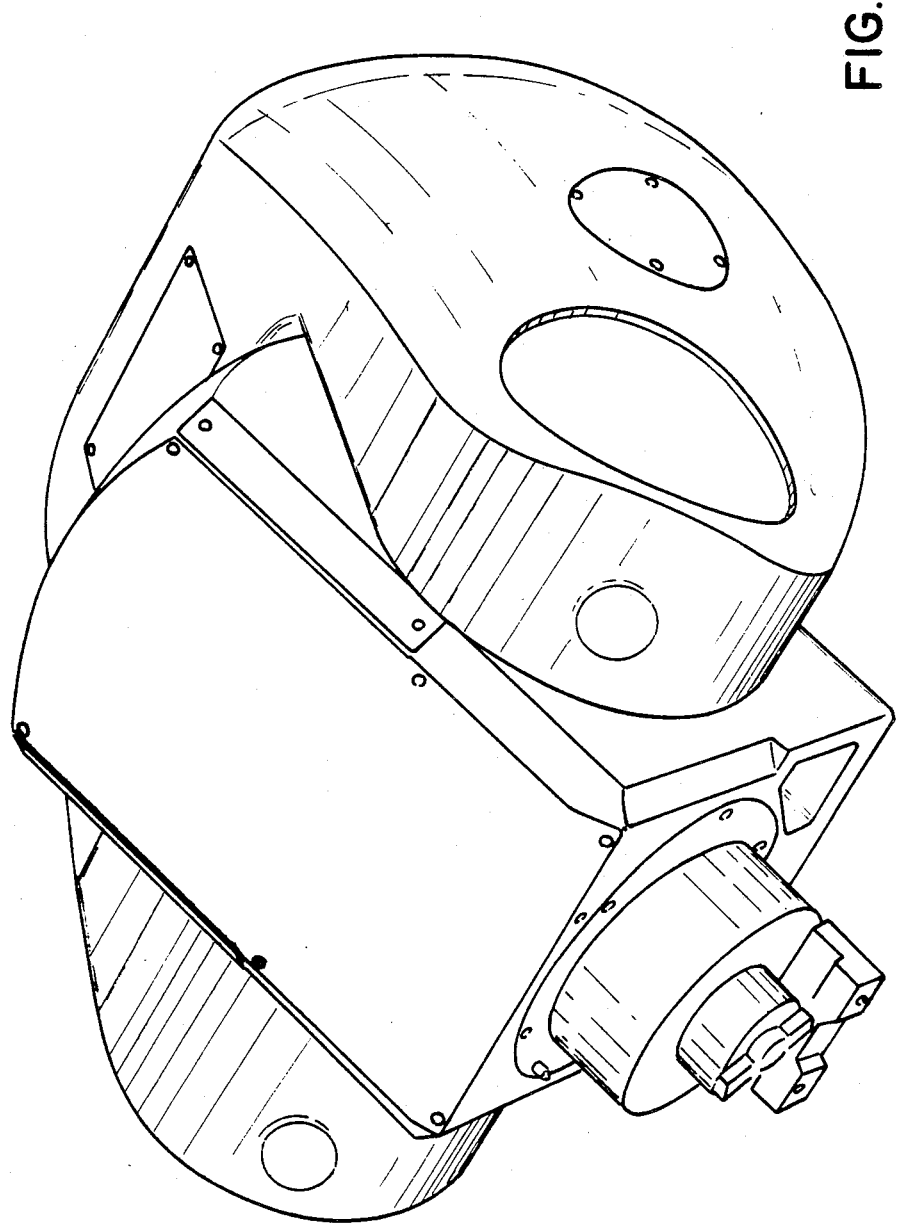
FIG. 4 is a perspective view of a head device according to the invention.

The operating head device according to the invention includes a two armed fork or housing 1, and on the inside of the fork, a box-like tool bearing or prop unit 2 for a mandrel 3 which is used to turn a cutting tool.

The fork is set over a shaft sliding along its own axis, not shown in the drawing and contained on the inside of a shell 4.

The sliding shaft can rotate around its own axis so as to rotate the fork.

Unit 2 is provided with a pair of protruding hollow trunnions 5, only one of which is shown in the figures, assembled inside ball bearings 6 which are fit in the arms of the fork. Consequently a tube 12 can rotate with respect to the fork around the axis X—X.

In the prop unit 2 near the mandrel 3, an opening 7 is provided which communicates, by means of a duct 8, with the internal area of one of the hollow trunnions 5. At the base of the fork 1 a ring chamber is formed from which a duct 10 branches off and extends along the arm of the fork reaching the trunnion 5.

Consequently the opening 7 communicates with the ring chamber 9, through the duct 8, the trunnion 5 and the dust 10.

On the inside of the shell 4, a duct 11 is provide which is joined to suction devices not described and which is connected to the ring chamber 9. Gaskets (not shown) are provided in the junction area, which are of a known type.

In this way the chamber 9 keeps constantly in communication with the duct 11 despite the rotation of the fork 1. So, this peculiar disposition of the parts allows a constant and continuons suction of the dust, whatever the positioning of the tools.

Also, through the trunnion 5, tube 12 passes for conveying a refrigerating fluid to the mandrel.

The rotations of the unit 2 around axis X—X are controlled via a gear transmission by a motor 13 placed at the base of the fork while the movements of the mandrel 3 along its own axis are the work of a second motor 14.

Both motors, shown only schematically, are preferably of the direct current rare earth type. These motors appear particularly suitable for this kind of application since they need little space and have a very high torque.

The supply cables of the motors 13 and 14, (not shown), coming from the shell through a central opening at the base of the fork 1, pass inside one of the arms and enter the trunnions 5 of that arm.

The fact that the suction ducts are located on the inside of the fork permits the fork to have a most rational shape. So the base of the fork 1 can assume the rounded shape shown in the figures and it is possible to round off the arms as well as the other components in order to confer to the operating head device a substantially rounded shape. All this has the remarkable advantage of a minimum encumbrance equal in all directions and for any positioning of the head or the mandrel.

That solves various problems in the case of the inner working of a workpiece. In fact it is sufficient that the dimensions of the inside of the workpiece to be worked on, are slightly larger than those of the head, for the inventive head to move freely in any direction without any obstacle whatsoever, easing enormously the working as well as the programming of the machine.

For the utilization of the operating head device, it is moved to the part to be worked on, placing the device with the necessary angle by means of the rotation of the fork 1 and of the tool bearing unit 2 whereupon the mandrel advances automatically and starts the working operation.

Simultaneously the debris and dusts made by the device are sucked through the opening 7 the ducts 8 and 10 the ring chamber 9 and the duct 11, following the route indicated by the arrows in the figures.

The operating head device so conceived, thanks to the peculiar shape given to the parts, can freely move even in limited spaces so the device can be brought into the optimal position for the work, continuously working without the need of interruptions.

Obviously the dimensions as well as the materials used can vary in function of the demands of utilization.

As shown in FIG. 1, fork housing 1 is substantially circular in cross-section taken on a plane parallel to axis X—X which passed through the hollow trunnions 5. The opening 7 is also shown to be in a corner area of the box-like tool bearing unit 2. The tool in a corner area of the box-like tool bearing unit 2. The tool unit 2 has a rectangular cross-section in the plane containing axis X—X. Opening 7 is advantageously pentagonal in cross-section as shown in FIG. 1. This leaves room for the mandrel 3 which occupies the central area of the front face of tool bearing unit 2.

I claim:

1. An operating head device for an automatic tool machine comprising:

a shaft including a shell having an axis and which is rotatable around said axis and displaceable along said axis;

a fork having a base connected to said shell and a pair of spaced-apart arms, said fork being rotatable with said shell about said axis and movable along said axis;

a tool-bearing unit having a pair of trunnions extending outwardly therefrom, at least one of said trunnions being hollow;

a ball bearing mounted to each arm of said fork and rotatably receiving said hollow trunnion for rotatably mounting said unit to said fork between said arms;

a mandrel rotably mounted in said unit and accessible from a front surface of said unit which is spaced from said trunnions;

said unit including a suction port in said front surface adjacent said mandrel and a first duct therein extending from said port to said hollow trunnion;

said base of said fork including a ring chamber therein, said fork having a second duct extending from said ring chamber to said hollow trunnion and communicating with said first duct.

2. A device according to claim 1, including a third duct in said shell communicating with said ring chamber.

3. A device according to claim 2, wherein said unit is box-shaped, said fork including its base and its arms having a rounded shape.

4. A device according to claim 3, including a tube for fluid extending through said arm of said fork which contains said second duct, said tube being connected to said unit and extending through said hollow trunnion.

5. A device according to claim 4, wherein said fork has dimensions which are substantially equal to all radial directions from said axis.

6. A device according to claim 5, wherein said arms of said fork together form a circular shape in cross-section taken in a plane containing said front surface of said unit.

7. A device according to claim 6, wherein said front surface is substantially rectangular, said suction port being adjacent a corner of said rectangular front surface.

8. A device according to claim 7, wherein said suction port is substantially pentagonal in shape and said mandrel is near the center of said substantially rectangular front surface of said unit.

* * * * *